(12) United States Patent
Kritzer et al.

(10) Patent No.: US 12,288,857 B2
(45) Date of Patent: Apr. 29, 2025

(54) ENERGY STORAGE SYSTEM (71) Applicant: CARL FREUDENBERG KG, Weinheim (DE)

(72) Inventors: Peter Kritzer, Forst (DE); Mark Boggasch, Laudenbach (DE); Daniela Woll, Bensheim (DE); Thomas Kramer, Rimbach (DE); Tanja Heislitz, Hofheim (DE); Armin Striefler, Oehringen (DE); Bjoern Hellbach, Birkenau (DE); Tim Leichner, Moerstadt (DE)

(73) Assignee: CARL FREUDENBERG KG, Weinheim (DE)

( * ) Notice: Subject to any disclaimer, the term of this patent is extended or adjusted under 35 U.S.C. 154(b) by 403 days.

(21) Appl. No.: 17/634,252

(22) PCT Filed: Jul. 23, 2020

(86) PCT No.: PCT/EP2020/070831
§ 371 (c)(1),
(2) Date: Feb. 10, 2022

(87) PCT Pub. No.: WO2021/028187
PCT Pub. Date: Feb. 18, 2021

(65) Prior Publication Data
US 2022/0416326 A1     Dec. 29, 2022

(30) Foreign Application Priority Data
Aug. 14, 2019 (DE) .................... 10 2019 121 849.7

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/643* (2015.04); *H01M 50/213* (2021.01); *H01M 50/229* (2021.01)

(58) Field of Classification Search
CPC ............. H01M 10/653; H01M 10/613; H01M 10/643; H01M 50/213; H01M 50/229;
(Continued)

(56) References Cited

U.S. PATENT DOCUMENTS 10,044,014 B2 * 8/2018 Kaiser ................ H01M 50/512
2010/0310911 A1 12/2010 Yamamoto et al.
(Continued)

FOREIGN PATENT DOCUMENTS

DE    102012022268 A1   5/2014
DE    102012222689 A1   6/2014
(Continued)

*Primary Examiner* — Abdullah A Riyami
*Assistant Examiner* — Nader J Alhawamdeh
(74) *Attorney, Agent, or Firm* — LEYDIG, VOIT & MAYER, LTD.

(57) ABSTRACT

A energy storage system includes at least one storage cell. The storage cell is provided at least in sections with a casing. The casing consists of plastic and is provided with a material for increasing a thermal conductivity. The material is configured such that a thermal runaway in the event of a fault is reduced.

19 Claims, 7 Drawing Sheets

(51) Int. Cl.
*H01M 10/643* (2014.01)
*H01M 50/213* (2021.01)
*H01M 50/229* (2021.01)

(58) Field of Classification Search
CPC ............. H01M 50/431; H01M 50/131; H01M 50/116; H01M 2220/20; H01M 10/0525; H01M 10/0587; H01M 50/107; H01M 50/124; H01M 50/1245; H01M 50/411; H01M 50/56; H01M 50/10; H01M 10/0409; H01M 10/658; H01M 50/122; H01G 2/08; H01G 11/18; H01G 11/78; Y02E 60/10; Y02P 70/50
See application file for complete search history.

(56) References Cited

U.S. PATENT DOCUMENTS

2017/0084893 A1* 3/2017 Kaiser ................ H01M 10/659
2018/0166757 A1* 6/2018 Smoot ............... H01M 10/6552
2018/0309107 A1 10/2018 Widener
2019/0140237 A1 5/2019 Kaye et al.
2020/0343495 A1 10/2020 Kritzer et al.
2021/0167444 A1 6/2021 Gaigg et al.
2022/0416326 A1* 12/2022 Kritzer ................ H01M 50/213

FOREIGN PATENT DOCUMENTS

| DE | 102013225574 A1 * | 6/2015 | .......... H01M 10/052 |
|---|---|---|---|
| DE | 102017008102 A1 | 2/2019 | |
| EP | 2492991 A1 | 8/2012 | |
| JP | 2003031187 A | 1/2003 | |
| WO | WO-2011117221 A1 * | 9/2011 | ............. H01G 11/82 |
| WO | WO-2015172997 A2 * | 11/2015 | .......... H01M 10/613 |
| WO | WO 2019046871 A1 | 3/2019 | |

* cited by examiner

ENERGY STORAGE SYSTEM

CROSS-REFERENCE TO PRIOR APPLICATIONS

This application is a U.S. National Phase application under 35 U.S.C. § 371 of International Application No. PCT/EP2020/070831, filed on Jul. 23, 2020, and claims benefit to German Patent Application No. DE 10 2019 121 849.7, filed on Aug. 14, 2019. The International Application was published in German on Feb. 18, 2021 as WO 2021/028187 A1 under PCT Article 21(2).

FIELD

The invention relates to an energy storage system comprising at least one storage cell with a casing in sections.

BACKGROUND

Energy storage systems are widely used and are used in particular as rechargeable accumulators for electrical energy in mobile and stationary systems. In this case, energy storage systems in the form of rechargeable accumulators are used in portable electronic devices, such as in measuring devices, medical devices, tools, or consumer articles. Furthermore, energy storage systems in the form of rechargeable accumulators are used to provide electrical energies for electrically driven means of transport. Electrically driven means of transport can be two-wheelers, four-wheelers, for example cars or utility vehicles, such as buses, trucks, rail vehicles, or forklifts. In addition, energy storage systems are used in ships and aircraft.

It is also known to provide energy storage systems in the form of rechargeable accumulators in stationary applications, for example as backup systems in network systems and for storing electrical energy from renewable energy sources.

A frequently used energy storage system is a rechargeable accumulator in the form of a lithium-ion accumulator. Such energy storage systems, like other rechargeable accumulators, also usually have several storage cells arranged in a housing. Several storage cells arranged in a housing and electrically connected to one another form a module.

Further known energy storage systems are, for example, lithium-sulfur accumulators, solid accumulators, or also metal-air accumulators.

Energy storage systems in the form of rechargeable accumulators have the maximum electrical capacity only within a limited temperature spectrum. If the optimal temperature spectrum is exceeded or undershot, the electrical capacity of the energy storage system decreases greatly, but at least the functionality of the energy storage system is impaired.

In particular, excessively high temperatures can lead to damage to the energy storage system. In this context, in particular in the case of lithium-ion cells, the so-called thermal runaway is known. In this case, high amounts of thermal energy and gaseous degradation products become free in a short period of time, resulting in high pressure and high temperatures in the storage cells. This effect is problematic in particular in the case of energy storage systems with a high energy density and accordingly many storage cells in a narrow space, as is necessary, for example, in energy storage systems for providing electrical energy for electrically driven vehicles. The problem of thermal runaway accordingly increases as a function of the increasing amount of energy of individual storage cells and by increasing the packing density of the storage cells arranged in a housing.

During thermal runaway of a storage cell, temperatures in the range of 600° C. or more can occur locally within the energy storage system over a period of about 30 seconds. By suitable measures, the energy transfer to adjacent storage cells is to be reduced to such an extent that the temperature of the adjacent storage cells does not rise too much. Preferably, the temperature of the adjacent storage cells should be at most 100° C. However, this value is highly dependent on the chemicals used for the accumulator and on the heat input from the cell housing into the cell coil. Accordingly, the temperature can also be significantly above or below 100° C.

Although the affected storage cell is also irreversibly damaged in this case, the damage can however be prevented from spreading to adjacent storage cells (avoidance of thermal propagation).

As a measure for this purpose, it is known, for example, from WO 2019/046871, to arrange a cooling device between the storage cells, wherein the device is designed to be planar and fits snugly against the sheath of the storage cells in sections.

SUMMARY

In an embodiment, the present invention provides an energy storage system. The energy storage system includes at least one storage cell. The storage cell is provided at least in sections with a casing. The casing consists of plastic and is provided with a material for increasing a thermal conductivity. The material is configured such that a thermal runaway in the event of a fault is reduced.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The invention relates to an energy storage system comprising at least one storage cell, wherein the storage cell is provided with a casing at least in sections, wherein the casing consists of plastic.

Embodiments of the present invention provide an energy storage system that has improved operational reliability.

The energy storage system according to exemplary embodiments of the present invention comprises at least one storage cell, wherein the storage cell is provided at least in sections with a casing, wherein the casing is of elastic design and consists of plastic, wherein the casing is provided with a material for increasing the thermal conductivity, wherein the material is designed such that the thermal runaway is reduced in the event of a fault.

The casing absorbs the heat emitted by the storage cells and conducts it away to a cooling device, for example to a cooler through which a cooling medium flows. Since the casing consists of plastic, the casing can be produced cost-effectively in large quantity. Furthermore, due to the elastic design, the casing abuts tightly on the outer side of the storage cell so that direct contact exists between the storage cell and the casing, which in turn is advantageous for heat conduction.

Most plastics, however, have a relatively poor thermal conductivity. Due to the material introduced into the casing for increasing the thermal conductivity, the thermal conductivity of the casing formed from plastic improves significantly. This ensures, in particular, that heat peaks that arise in a storage cell can be reliably dissipated. The thermal conductivity of the casing designed according to preferred embodiments of the present invention is preferably at least 0.6 W/(m·K).

The storage cell may be a round cell. Storage cells in the form of lithium-ion accumulators are frequently designed as round cells. They can be produced in high quantities and in good quality. In particular, round cells having a diameter of 18 mm and a length of 65 mm or a length of 70 mm and a diameter of 21 mm are particularly frequent. The round cell of smaller diameter is predominantly used in applications in which a high voltage is required with simultaneously limited system energy. For example, such round cells are used in electric vehicles and also in power tools. Fields of application of the larger round cells are, for example, utility vehicles, such as forklifts. However, designs of round cells with larger or smaller lengths and diameters are also known.

Round cells have a cylindrical sheath, a bottom, and a cover on the side opposite the bottom. The bottom and the sheath are usually made of uniform material and in one piece. The cover is a separate component and electrically insulated from the sheath or the bottom. Accordingly, one pole is usually assigned to the cover and the other pole is assigned to the sheath or bottom. In the embodiment described above, both the sheath and the bottom of the storage cell are electrically conductive. In order to prevent unintentional short-circuiting and creeping currents within the energy storage system, it is therefore known to insulate the housing of the storage cells outside of the contacts. The insulation usually consists of an insulating polymeric material, which can be designed, for example, as a shrinking tube which surrounds the sheath of the storage cell. Accordingly, the casing according to the invention can also be designed in such a way that it surrounds the sheath of the storage cell at least in sections. The casing is preferably designed to be electrically insulating.

Since the casing is designed to be elastic, it can easily be pushed onto the cylindrical sheath of the round cell and also follow dimensional changes of the storage cell occurring during operation, for example during charging or discharging, and can thus prevent an impermissibly high internal pressure from building up within the storage cell. In principle, it is conceivable that the casing is formed from a textile fabric, for example a nonwoven. Such fabrics are compressible and easy to assemble.

The casing is furthermore designed to be temperature-resistant and equipped to withstand a temperature load of 600° C. over a period of at least 30 seconds. In this case, the casing should surround the storage cell after such a thermal load such that an impermissibly high heat transfer to adjacent storage cells is prevented.

The casing may be made of elastomeric material. It is true that elastomeric materials frequently have only a limited thermal conductivity. However, equipping the material according to embodiments of the invention with a material for increasing the thermal conductivity results in a sufficiently high thermal conductivity to be able to dissipate the heat generation of the cells during normal operation.

According to a further advantageous embodiment, an endothermically acting material, which, when a temperature is exceeded, absorbs thermal energy once and thus also in order to dissipate thermal peak loads, which arise, for example, during thermal runaway, is introduced into the elastomeric material.

Advantageous elastomeric materials are, for example, silicone-based elastomers or ethylene propylene diene monomers (EPDM). Silicone elastomers are highly temperature-resistant and have a certain resistance to flaming. When EPDM is used, it is preferred if the material is additionally equipped with a flame-retardant material.

The casing may be tubular. A casing designed in this way is advantageous in particular in connection with round cells.

Alternatively, the casing can be designed from sheeting. This allows the casing to be adapted to a plurality of shapes of various storage cells. During assembly, the sheet-shaped casing is placed around the storage cell at least in sections. Subsequently, the overlapping regions of the casing can be integrally bonded to one another.

The casing can be contoured on the outside. In particular, it is conceivable for the casings to be designed on the outside in such a way that the casings of several adjacent storage cells come into close and large-area contact with one another. This ensures heat transport across a plurality of storage cells. Depending on the design, the contour can also result in an enlarged surface so that improved heat dissipation in the direction of the environment results.

The casing can be designed to be flat on the outside at least in regions. With respect to the casing for a round cell, the casing can be designed, for example, in a D shape along the outer contour. Due to the flattened portion of the outer contour of the casing in regions, a large abutment surface of the casing on an adjacent component results, which is in particular advantageous when the storage cells with the casing are to be arranged on a planar cooling element. In this case, the casing can be contoured on the outside and/or inside such that a uniform thickness of the material is provided around the circumference of the casing.

The material for increasing the thermal conductivity can be an electrically insulating, inorganic filler. Such materials can be found, for example, in the group of ceramic materials.

In order to improve the protective function in the event of a fault, materials that are subject to an endothermic reaction when heated above 100° C., the reaction triggered, for example, by the release of crystal water, are particularly advantageous. Such materials are, for example, inorganic hydroxides or oxide hydroxides, for example $Mg(OH)_2$, $Al(OH)_3$, or AlOOH. When a material-specific decomposition temperature is exceeded, these compounds release water while absorbing energy. Particular preference is given here to aluminum hydroxide ($Al(OH)_3$) because, with it as a filler, thermal conductivities of up to 1 W/(m·K) can be realized in mixtures (compounds) and this filler releases crystal water in the temperature range between 200° C. and 250° C. The endothermic reaction markedly reduces the heat transfer between adjacent storage cells in the event of damage.

Such materials are therefore particularly suitable to limit the high thermal runaway, desired during normal operation, at temperatures above 100° C. and thereby thermally insulate the storage cell.

Also advantageous are materials which release gases, for example $CO_2$, at temperatures above 100° C. The release of gas within the casing leads to an additional one-time heat cushion and slows down the heat transfer between the storage cells. Such materials can be found in the group of carbonates, for example $K_2CO_3$, $Na_2CO_3$, or $CaCO_3$. Mixtures of these materials are also conceivable.

Due to the high specific heat absorption of the decomposing materials, the casing can be designed to be thin and space-saving. Nevertheless, the casing has good thermal insulation in the direction of adjacent storage cells in the event of damage.

In this case, it is in particular advantageous that the casing with the material decomposing in the event of damage has a high thermal conductivity under normal operating conditions but, in case of damage, a high amount of energy is absorbed within the casing by the endothermic reaction without high amounts of heat being transferred to adjacent storage cells. In the case of normal operating conditions, however, the heat emitted within the storage cell is dissipated in the direction of a cooling device.

The material can be designed in such a way that it functions as a latent heat accumulator. Such latent heat accumulator materials are, for example, phase-change materials, wherein the material is preferably selected such that the temperature of the phase transition between solid and liquid is at least 100° C.

The material for increasing the thermal conductivity can be introduced into a planar matrix, wherein the matrix is embedded in the casing. The matrix may, for example, consist of a thermally resistant nonwoven. It is advantageous here that a particularly homogeneous distribution of the material over the surface of the casing is possible so that large quantities of material can be introduced into the casing. The material can be introduced into the matrix by customary processes, such as knife coating or padding. The matrix can alternatively be arranged near the surface or along a surface.

In preferred embodiments, the casing preferably has a thickness of at most 3 mm, and in more preferred embodiments the thickness of the casing is preferably less than 1.5 mm.

The casing may be contoured on the side facing the storage cell. In this context, it is conceivable to integrate longitudinal ribs into the casing. They can be designed as channels leading to the storage cell. On the one hand, the longitudinal ribs simplify the assembly of the casing. On the other hand, the longitudinal channels can ensure that the released gases are discharged in a targeted manner from the material of the casing in the direction of the longitudinal ribs during an endothermic reaction of the correspondingly designed material, without undesirably high pressures or stresses forming in the material.

The casing may also be designed such that it receives more than one storage cell and electrically insulates the storage cells from one another. For example, a casing for two storage cells can be formed in the shape of an eight.

As a result of the contour applied to the inner side of the casing, regions which abut on the storage cells and other regions which are spaced apart from the storage cells can form in the casing. Cavities which improve the thermal insulation of the casing are formed thereby. In addition, it is conceivable that the cavities directly adjacent to the storage cell are used as cooling channels through which a gaseous or liquid cooling medium is passed.

Such structuring results, for example, when the device is structured in the shape of ribs. Such a design also results when the device is profiled in the shape of waves over the circumference on the inside. In both embodiments, it is advantageous that they can be produced in an extrusion process.

The casing can have channels which run within the casing. In preferred embodiments, the channels run along the casing. Such channels improve the insulating effect of the casing.

Thermally insulating fillers can be introduced into the casing. In this case, the fillers are preferably designed such that they produce an intrinsic porosity and thus an intrinsic gas cushion in the interior of the casing. This results in microscopic cavities. Such materials are, for example, hollow glass spheres and highly porous, inorganic materials, such as aerosils, expanded materials, or aerogels. Furthermore, the use of finely distributed blowing agents for fine or micropore foaming of the casing is conceivable. Already expanded graphites or expandable graphites are also conceivable in principle but are not preferred based on the electrical conductivity.

Figure 1:
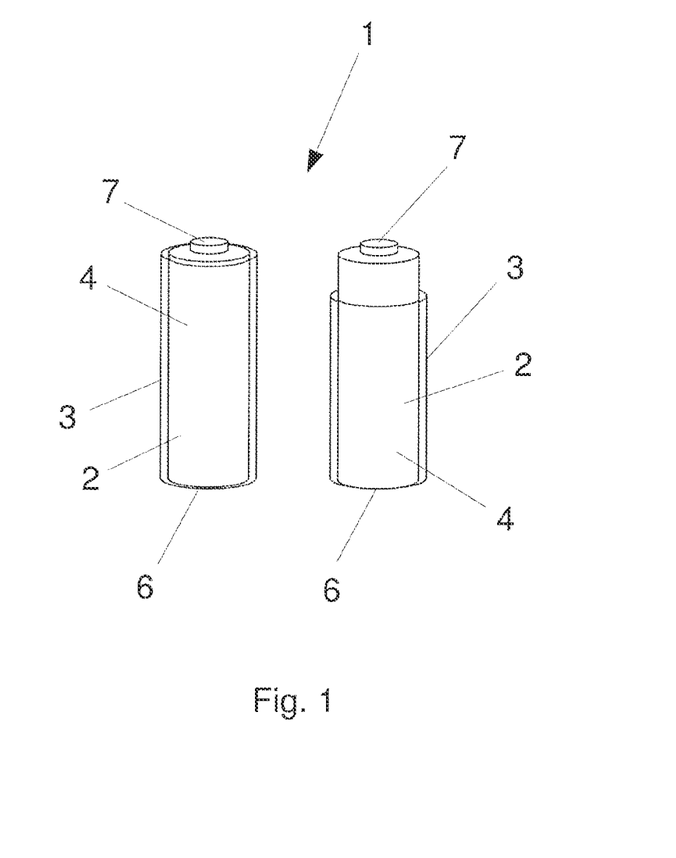
FIG. 1 shows exemplary storage cells with a tubular casing, wherein the casing covers the sheath of the storage cell once completely and once partially.

The figures show an energy storage system 1 comprising at least one storage cell 2. In the present embodiments, the storage cell 2 is an accumulator for storing electrical energy. The accumulator of the embodiment of FIG. 1 is preferably a lithium-ion accumulator. The accumulator may likewise be a lithium-sulfur accumulator, a solid-state accumulator, or a metal-air accumulator.

In certain embodiments, the storage cell 2 is designed as a round cell and, according to a first embodiment, has a diameter of 18 mm and a length of 65 mm and, in a second embodiment, has a length of 70 mm and a diameter of 21 mm. The storage cells 2 have a housing with a bottom 6 and a sheath 4 and are closed by a cover 7 on the side opposite the bottom 6. The cover 7 and sheath 4 or bottom 6 are electrically insulated from one another. The storage cell 2 is contacted via the bottom 6 and the cover 7.

The energy storage system 1 further comprises a housing in which a plurality of storage cells 2 is arranged. In this case, the storage cells 2 are arranged upright next to one another.

Storage cell 2 is provided at least in sections with a casing 3. The casing 3 is elastic and consists of plastic; in the present embodiment, the casing 3 consists of a silicone elastomer. In order to increase the thermal conductivity, the elastomeric material, the silicone elastomer, is provided with a material for increasing the thermal conductivity. The material for increasing the thermal conductivity is an electrically insulating, inorganic filler, in the present case a ceramic material.

In this context, advantageous ceramic materials are inorganic hydroxides or oxide hydroxides, for example $Mg(OH)_2$, $Al(OH)_3$, or $AlOOH$. They release water vapor at higher temperatures. Aluminum hydroxide ($Al(OH)_3$) is particularly advantageous since thermal conductivities of up to 1 W/(m·K) can be realized in compounds with this filler and this filler releases crystal water in a temperature range from 200° C. to 250° C.

The material formed from silicone elastomer and ceramic material for increasing the thermal conductivity of the casing 3 formed is designed to be electrically insulating.

In certain embodiments, the casing 3 is tubular and can be produced in the extrusion process. According to an advantageous alternative embodiment, the casing 3 is formed from sheeting.

In exemplary embodiments, the casing 3 has a material thickness of 1.2 mm.

FIG. 1 shows a first embodiment of an energy storage system 1. On the left side, FIG. 1 shows a first storage cell 2, which is provided with a casing 3, which surrounds the sheath 4 of the storage cell 2. As a result of this embodiment, the sheath 4 is electrically insulated from the environment, in particular from further storage cells. The right-hand side shows a further storage cell 2, which is likewise provided with a casing 3. However, the latter surrounds the sheath 4 only in sections.

Figure 2:
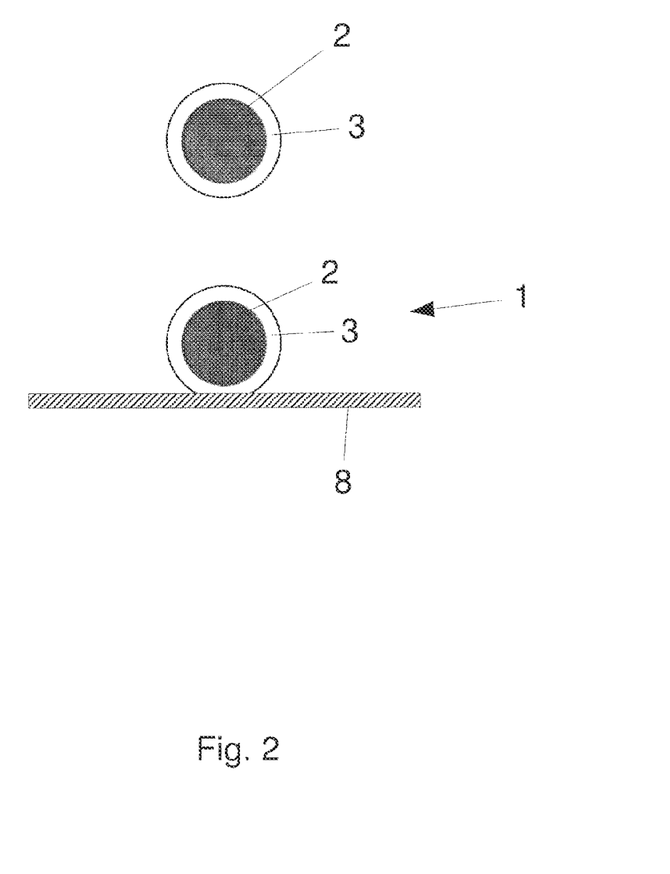
FIG. 2 shows an exemplary elastic casing.

In the upper region, FIG. 2 shows a storage cell 2 with a tubular casing 3 in plan view. The casing 3 is formed from elastomeric material and is elastic as a result. The lower region shows the storage cell 2, which together with the casing 3 is pressed onto a planar cooling element 8. In so doing, the casing 3 deforms in sections so that a partial planar contact of the casing 3 to the cooling element 8 results.

According to the present exemplary embodiment, the casing 3, provided with a material for increasing the thermal conductivity, has a thermal conductivity of 1.1 W/(m·K).

Figure 3:
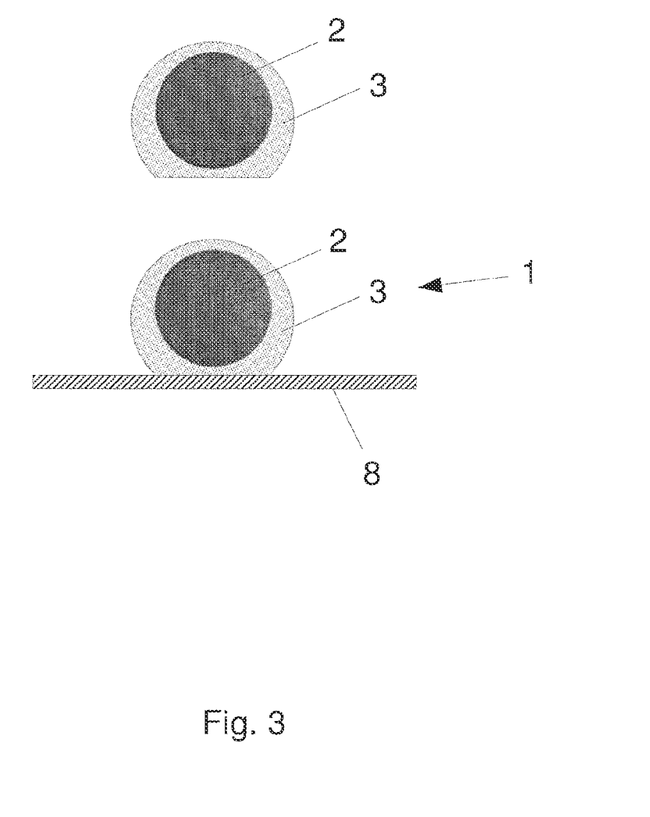
FIG. 3 shows an exemplary D-shaped casing.

In the upper region, FIG. 3 shows a storage cell 2 with a tubular casing 3, which surrounds the sheath 4 of the storage cell 2. The casing 3 is contoured on the outside and is formed in a D shape in the present embodiment. As a result, the casing 3 has, on the outside, a flattened portion which is suitable for planar abutment of the casing 3 on a cooling device 8. This embodiment with cooling device can be seen in the lower illustration.

Figure 4:
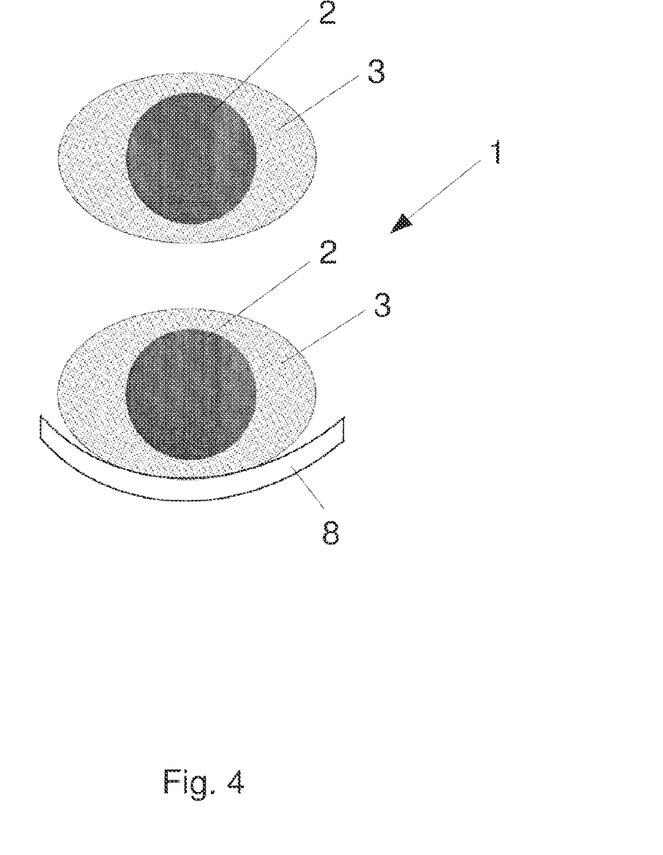
FIG. 4 shows an exemplary oval casing.

FIG. 4 shows a storage cell 2 surrounded by a tubular casing 3. The casing 3 is contoured on the outside in such a way that the casing 3 is formed in an oval shape on the outside. A casing 3 designed in this way is in particular suitable for abutting on a concavely curved cooling element 8, as shown in the lower region of the figure.

Figure 5:
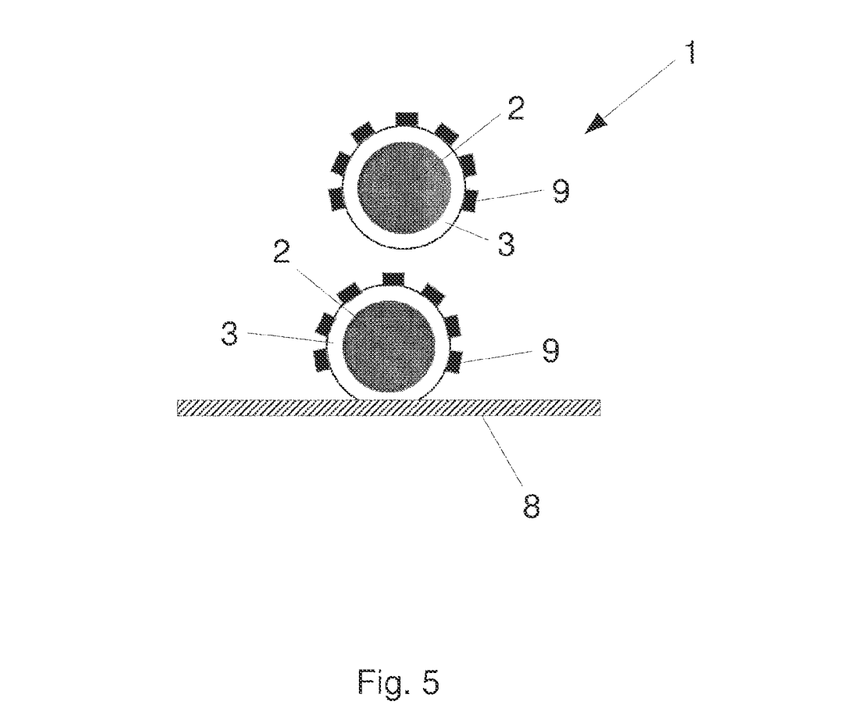
FIG. 5 shows an exemplary casing with a contour on the outside.

FIG. 5 shows a storage cell 2 provided with a tubular casing 3. The casing 3 is contoured in sections on the outside and has elevations 9, distributed over a part of the circumference, in the form of rectangular ribs extending in the longitudinal direction. As a result of this contour, the outer surface of the casing increases significantly so that improved heat transfer in the direction of the environment results. In the lower region of the figure, it can be seen that the casing 3 is elastic and is elastically deformed upon contact with a cooling element 8 so that a planar abutment of the casing 3 on the cooling element 8 results here.

Figure 6:
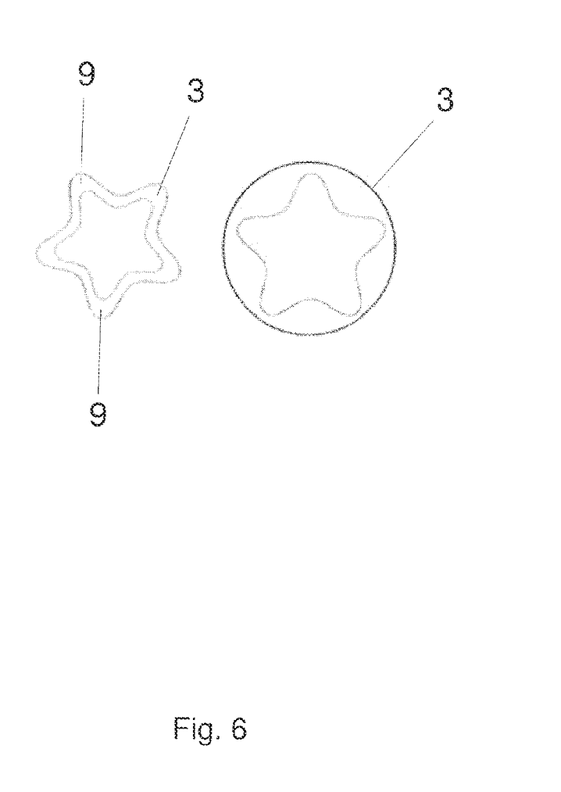
FIG. 6 shows an exemplary casing with a star-shaped contour on the inside and/or outside.

FIG. 6 shows an alternative embodiment of the casing 3 shown in FIG. 5. In the present embodiment, the casing 3 in the left exemplary embodiment is contoured in a star shape on the outside. According to the right embodiment, the casing 3 is round on the outside. Both embodiments have a star-shaped contour on the inside.

Figure 7:
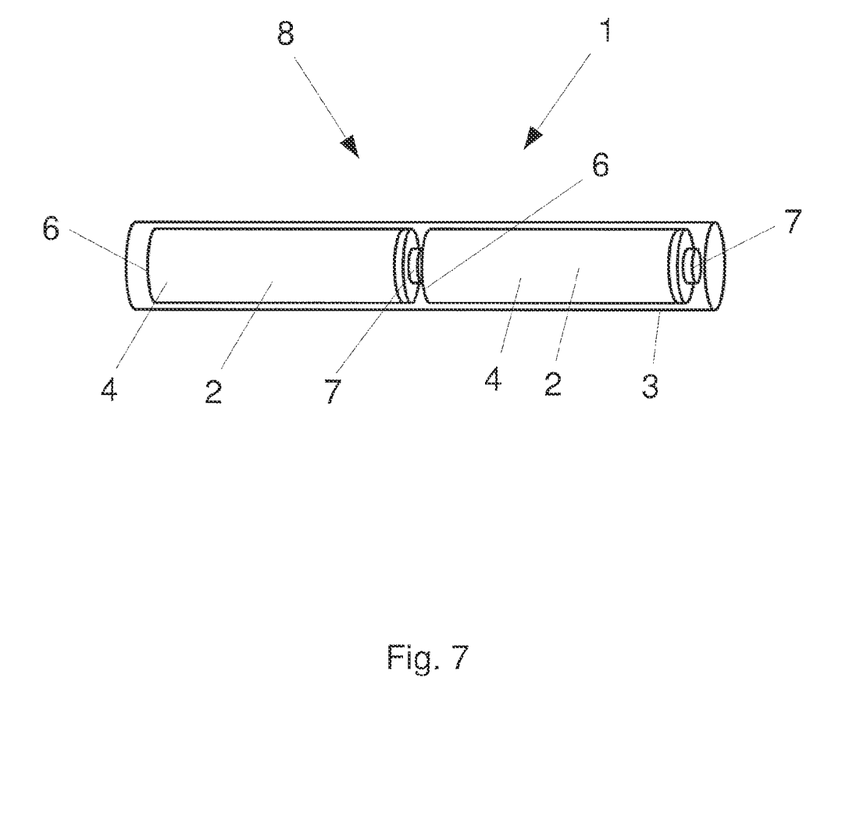
FIG. 7 shows an exemplary arrangement of storage cells with casing.

FIG. 7 shows an arrangement 8 of storage cells 2, wherein several storage cells 2 are arranged coaxially with one another and are surrounded by a single tubular casing 3. In this embodiment, the casing 3 functions as a carrier for a number of storage cells 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An energy storage system, the energy storage system comprising at least one storage cell, wherein the at least one storage cell is provided at least in sections with a casing, wherein the casing consists of plastic, wherein the casing is provided with a material for increasing a thermal conductivity, wherein the material is configured such that a thermal runaway in the event of a fault is reduced, and wherein the material for increasing the thermal conductivity is an endothermically acting material which is subject to an endothermic reaction at temperatures above 100° C. and reduces the thermal conductivity at temperatures above 100° C.

2. The energy storage system according to claim 1, wherein the casing is elastic.

3. The energy storage system according to claim 1, wherein the at least one storage cell is a round cell.

4. The energy storage system according to claim 1, wherein the casing surrounds a sheath of the at least one storage cell at least in sections.

5. The energy storage system according to claim 1, wherein the casing is electrically insulating.

6. The energy storage system according to claim 1, wherein the casing is formed from a elastomeric material.

7. The energy storage system according to claim 1, wherein the casing is tubular.

8. The energy storage system according to claim 1, wherein the casing is formed from a sheeting which surrounds the at least one storage cell at least partially.

9. The energy storage system according to claim 1, wherein the casing abuts on a sheath of the at least one storage cell under pretension.

10. The energy storage system according to claim 1, wherein the material for increasing the thermal conductivity is an electrically insulating, inorganic filler.

11. The energy storage system according to claim 1, wherein the material is selected from a group of metal hydroxides, metal oxyhydroxides, metal carbonates, or metal hydrogen carbonates.

12. The energy storage system according to claim 1, wherein an electrically insulating, inorganic further filler having thermally insulating properties for limiting the thermal conductivity is introduced into the casing.

13. The energy storage system according to claim 12, wherein the further filler comprises hollow glass spheres and/or aerogels.

14. The energy storage system according to claim 1, wherein the casing is contoured on the outside.

15. The energy storage system according to claim 1, wherein the casing is configured to be flat on the outside at least in regions.

16. The energy storage system according to claim 1, wherein the casing is contoured on the side facing the storage cell.

17. The energy storage system according to claim 1, wherein the casing transfers heat emitted by the at least one storage cell to a cooling device.

18. The energy storage system according to claim 17, wherein the casing abuts planarly on the cooling device.

19. An energy storage system, the energy storage system comprising:
   at least one storage cell;
   a casing disposed on the at least one storage cell at least in sections, the casing comprising a plastic and a further material with a greater thermal conductivity than the plastic, wherein the further material with the greater thermal conductivity is an endothermically acting material which is subject to an endothermic reaction at temperatures above 100° C. and reduces the thermal conductivity at temperatures above 100° C., and wherein the further material is selected from a group of metal hydroxides. metal oxyhydroxides, metal carbonates, or metal hydrogen carbonates; and
   a coolant thermally coupled to the material.

* * * * *